(12) United States Patent
Fukushima et al.

(10) Patent No.: US 11,424,459 B2
(45) Date of Patent: Aug. 23, 2022

(54) FUEL CELL SYSTEM

(71) Applicant: NISSAN MOTOR CO., LTD., Yokohama (JP)

(72) Inventors: Eisuke Fukushima, Kanagawa (JP); Hayato Chikugo, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/273,458

(22) PCT Filed: Sep. 12, 2018

(86) PCT No.: PCT/JP2018/033891
§ 371 (c)(1),
(2) Date: Mar. 4, 2021

(87) PCT Pub. No.: WO2020/054003
PCT Pub. Date: Mar. 19, 2020

(65) Prior Publication Data
US 2022/0052359 A1    Feb. 17, 2022

(51) Int. Cl.
*H01M 8/04* (2016.01)
*H01M 8/04014* (2016.01)
(Continued)

(52) U.S. Cl.
CPC ... *H01M 8/04022* (2013.01); *H01M 8/04395* (2013.01); *H01M 8/04708* (2013.01);
(Continued)

(58) Field of Classification Search
CPC ......... H01M 8/04022; H01M 8/04395; H01M 8/04708; H01M 8/04776
See application file for complete search history.

(56) References Cited

U.S. PATENT DOCUMENTS

2018/0358640 A1* 12/2018 Shiomi ............ H01M 8/04447

FOREIGN PATENT DOCUMENTS

JP   2008-277280 A   11/2008
WO  WO2017104301   *  6/2017

* cited by examiner

*Primary Examiner* — Olatunji A Godo
(74) *Attorney, Agent, or Firm* — Foley & Lardner LLP

(57) ABSTRACT

A fuel cell system comprising: a fuel cell configured to be supplied with a fuel and air to generate an electric power;
a combustor configured to combust an off-gas discharged from the fuel cell to produce a combustion discharged gas;
a fuel heating part configured to heat the fuel to be supplied to the fuel cell by the combustion discharged gas;
an air heating part configured to heat the air to be supplied to the fuel cell by the combustion discharged gas;
an anode-side distribution passage configured to distribute the combustion discharged gas to the fuel heating part;
a cathode-side distribution passage configured to distribute the combustion discharged gas to the air heating part; and
a discharged gas distribution ratio adjustment part configured to adjust a discharged gas distribution ratio, the discharged gas distribution ratio being a ratio of an anode-side combustion discharged gas flow rate to a cathode-side combustion discharged gas flow rate,
the anode-side combustion discharged gas flow rate being a flow rate of the combustion discharged gas that flows in the anode-side distribution passage,
the cathode-side combustion discharged gas flow rate being a flow rate of the combustion discharged gas that flows in the cathode-side distribution passage,
(Continued)

wherein the discharged gas distribution ratio adjustment part is configured to reduce the discharged gas distribution ratio according to an increase in a supply air flow rate as a flow rate of the air to be supplied to the fuel cell.

7 Claims, 12 Drawing Sheets

(51) Int. Cl.
*H01M 8/0438* (2016.01)
*H01M 8/04701* (2016.01)
*H01M 8/04746* (2016.01)
*H01M 8/0662* (2016.01)
*H01M 8/12* (2016.01)

(52) U.S. Cl.
CPC ..... *H01M 8/04776* (2013.01); *H01M 8/0662* (2013.01); *H01M 2008/1293* (2013.01)

FUEL CELL SYSTEM

TECHNICAL FIELD

The present invention relates to a fuel cell system.

BACKGROUND ART

JP2008-277280A proposes a fuel cell system equipped with a so-called parallel exhaust system in which a high-temperature discharged gas produced in a combustion chamber located downstream of a stack is made to flow to an air preheating part (cathode exhaust side) and a reformer (anode exhaust side) in parallel, and the discharged gas having passed through these air preheating part and reformer is discharged to the outside.

In this fuel cell system, in order to effectively utilize the heat of the high-temperature discharged gas, a valve on the anode exhaust side is opened to cause the high-temperature discharged gas to flow to the reformer for heating it regardless of an operating mode. In a start-up mode selected when starting the system, a valve provided on the cathode exhaust side is opened to cause the high-temperature discharged gas to flow also to the air preheating part on the cathode exhaust side. That is, in the start-up mode, the high-temperature discharged gas is distributed to the cathode exhaust side and the anode exhaust side.

SUMMARY OF INVENTION

However, in the fuel cell system described above, the flow rate of the high-temperature discharged gas produced in the combustion chamber in the start-up mode increases compared to that in a steady mode so that the flow rate of the high-temperature discharged gas distributed to the anode exhaust side also increases.

As a result, there is a problem that heat energy possessed by the high-temperature discharged gas made to flow to the anode exhaust side exceeds heat energy that can be recovered by heat exchange in the reformer, leading to an increase in energy (exhaust energy) discharged to the outside of the system.

It is an object of the present invention to provide a fuel cell system that can solve the problem described above.

As an aspect of the present invention, a fuel cell system is provided. The fuel cell system includes a fuel heating part configured to heat the fuel to be supplied to the fuel cell by the combustion discharged gas, an air heating part configured to heat the air to be supplied to the fuel cell by the combustion discharged gas, an anode-side distribution passage configured to distribute the combustion discharged gas to the fuel heating part, a cathode-side distribution passage configured to distribute the combustion discharged gas to the air heating part; and a discharged gas distribution ratio adjustment part configured to adjust a discharged gas distribution ratio, the discharged gas distribution ratio being a ratio of an anode-side combustion discharged gas flow rate to a cathode-side combustion discharged gas flow rate. The discharged gas distribution ratio adjustment part is configured to reduce the discharged gas distribution ratio according to an increase in a supply air flow rate as a flow rate of the air to be supplied to the fuel cell.

DESCRIPTION OF EMBODIMENTS

Hereinafter, first to third embodiments according to the present invention will be described with reference to the drawings. First, the prerequisite configuration of a fuel cell system S common to the respective embodiments will be described.

(Prerequisite Configuration of Fuel Cell System S)

Figure 1:
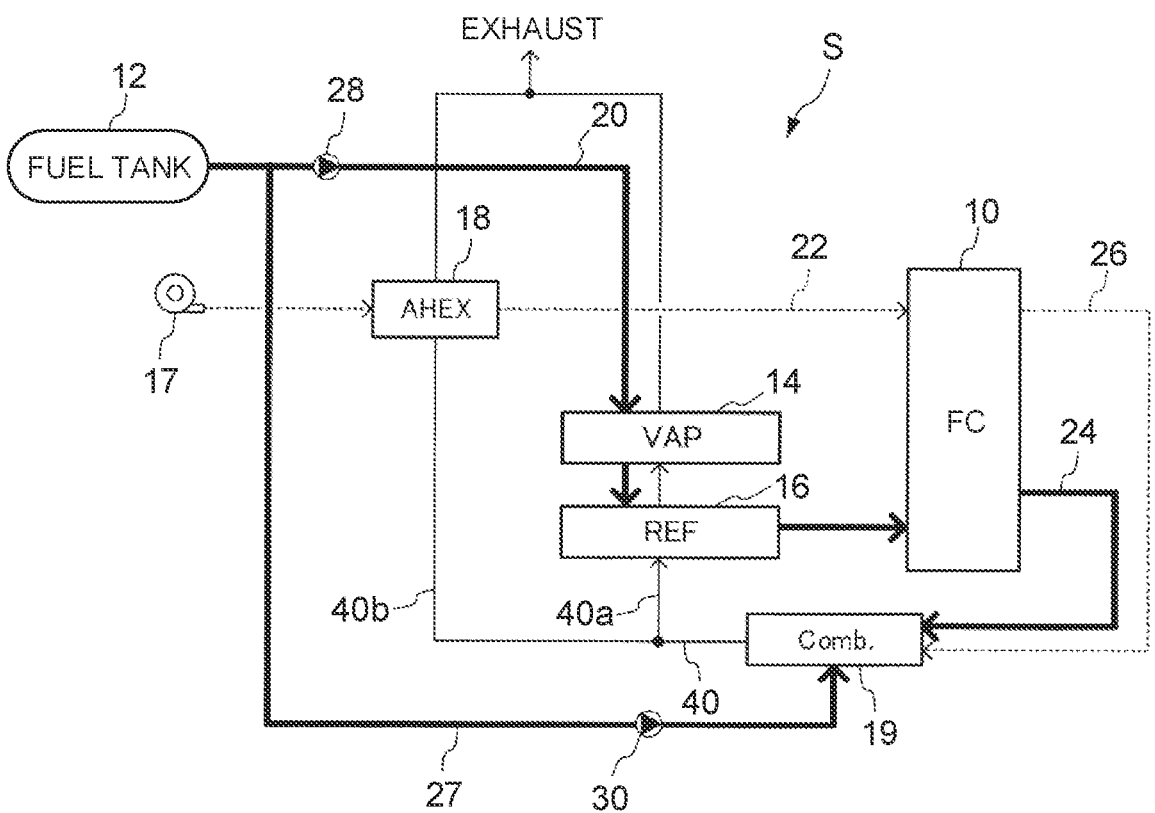
FIG. 1 is a diagram for explaining the configuration of a fuel cell system as a prerequisite.

FIG. 1 is a diagram for explaining the configuration of the fuel cell system S as the prerequisite. The fuel cell system S is used as a power generation system installed in a stationary or moving body. In particular, the fuel cell system S can be installed in a moving body such as a vehicle.

As illustrated, the fuel cell system S includes a fuel cell stack 10 as a fuel cell, a fuel tank 12, an evaporator 14, a reformer 16, an air blower 17, an air heat exchanger 18, and a combustor 19.

The fuel cell stack 10 is formed by stacking a plurality of fuel cells or fuel-cell unit cells, and the individual fuel cells serving as power generation sources are each, for example, a solid oxide fuel cell (SOFC: Solid Oxide Fuel Cell).

The fuel cell stack 10 is supplied with a fuel (e.g. hydrogen gas) through a main fuel supply passage 20 and supplied with air through an air supply passage 22.

Further, the fuel cell stack 10 is provided with an anode off-gas passage 24 and a cathode off-gas passage 26 for allowing an off-gas on the anode electrode side and an off-gas on the cathode electrode side after power generation reaction to flow therethrough, respectively.

The fuel tank 12 stores, as a raw fuel before reforming, a liquid fuel composed of a mixture of oxygenated fuel (e.g. ethanol) and water. The raw fuel stored in the fuel tank 12 is distributed to the main fuel supply passage 20 and a sub fuel supply passage 27 so as to be distributed to the evaporator 14 and the combustor 19 connected to the respective passages.

The evaporator 14 heats and evaporates the raw fuel supplied from the fuel tank 12. In the case of a system that stores a raw fuel as a gas, the evaporator 14 may be omitted.

The reformer 16 reforms an unreformed fuel gas into a state suitable for supply to the fuel cell stack 10. For example, the reformer 16 performs steam reforming of the unreformed fuel gas using a non-illustrated reforming catalyst, thereby producing a fuel gas composed mainly of hydrogen.

The reformer 16 has inside a heat exchanger for performing heat exchange between a combustion discharged gas from the combustor 19, which will be described later, and the fuel.

The evaporator 14 and the reformer 16 are disposed in the main fuel supply passage 20. The main fuel supply passage 20 is a passage connected from the inside of the fuel tank 12 to an inlet of the anode electrode of the fuel cell stack 10, wherein a first injector 28, the evaporator 14, and the reformer 16 are disposed in this order from the fuel tank 12.

The first injector 28 is configured to be adjustable in opening degree so as to adjust the flow rate of the fuel to be supplied (injected) to the evaporator 14. Therefore, the raw fuel stored in the fuel tank 12 is injected to the evaporator 14 of the main fuel supply passage 20 by the first injector 28 at a desired flow rate (hereinafter also referred to as a "main supply fuel flow rate") and supplied to the fuel cell stack 10 through evaporation by the evaporator 14 and reforming by the reformer 16.

The opening degree of the first injector 28 (the main supply fuel flow rate) is controlled as appropriate according to a required power-generation electric power of the fuel cell stack 10, an operating state (steady operation, warm-up operation, cooling operation during stop or the like, or the like) of the fuel cell system S, a target combustor temperature Tc_t (a gas temperature near the combustor 19 in a combustion discharged gas passage 40), a later-described supply air flow rate Qa, and so on.

On the other hand, the air blower 17 is a device that takes air from the outside into the air supply passage 22 inside the fuel cell system S. By controlling the output of the air blower 17, the flow rate of the air taken into the air supply passage 22 (hereinafter also referred to as a "supply air flow rate Qa") can be adjusted as appropriate.

In particular, the output of the air blower 17 is controlled to satisfy a target value of the supply air flow rate Qa that is determined according to the power-generation electric power of the fuel cell stack 10, the operating state (steady operation, warm-up operation, cooling operation during stop or the like, or the like) of the fuel cell system S, and so on.

The air heat exchanger 18 is a device that performs heat exchange between the air supplied by the air blower 17 and a later-described combustion discharged gas. The air heat exchanger 18 is disposed in the air supply passage 22 connected from the air blower 17 to an inlet of the cathode electrode of the fuel cell stack 10. In terms of adjusting the amount of heat exchange between the air and the combustion discharged gas, a bypass passage and a bypass valve for bypassing the air heat exchanger 18 may be provided to the air supply passage 22.

The combustor 19 is supplied with the raw fuel from the fuel tank 12 and supplied with the off-gases from the fuel cell stack 10 and catalytically combusts a mixture of them to produce a combustion discharged gas.

The combustor 19 is connected to the anode off-gas passage 24 connected to an outlet of the anode electrode of the fuel cell stack 10 and is connected to the cathode off-gas passage 26 connected to an outlet of the cathode electrode of the fuel cell stack 10. The sub fuel supply passage 27 is connected to the combustor 19. That is, the combustor 19 is supplied with the off-gases from the fuel cell stack 10 through the anode off-gas passage 24 and the cathode off-gas passage 26.

The sub fuel supply passage 27 branched from the main fuel supply passage 20 is connected to the combustor 19. The sub fuel supply passage 27 is provided with a second injector 30.

The second injector 30 adjusts the flow rate of the fuel to be supplied (injected) to the combustor 19. Therefore, the raw fuel stored in the fuel tank 12 is injected to the combustor 19 by the second injector 30 at a desired flow rate (hereinafter also referred to as a "sub supply fuel flow rate").

In particular, the opening degree of the second injector 30 (the sub supply fuel flow rate) is adjusted as appropriate according to the supply air flow rate Qa, the target combustor temperature Tc_t, and so on.

Further, the combustion discharged gas passage 40 for the flow of the produced combustion discharged gas is connected downstream of the combustor 19. The combustion discharged gas passage 40 includes an anode-side distribution passage 40a that distributes a part of the combustion discharged gas to the reformer 16, and a cathode-side distribution passage 40b that distributes a part of the combustion discharged gas to the air heat exchanger 18.

The anode-side distribution passage 40a communicates with the outside air through the reformer 16 and the evaporator 14. The cathode-side distribution passage 40b is joined to the anode-side distribution passage 40a through the air heat exchanger 18 and communicates with the outside air. That is, a parallel exhaust system composed of the anode-side distribution passage 40a and the cathode-side distribution passage 40b is formed in the fuel cell system S of this embodiment.

Hereinafter, the flow rate of the combustion discharged gas in the anode-side distribution passage 40a will be referred to as an "anode-side combustion discharged gas flow rate Fan". Further, the flow rate of the combustion discharged gas in the cathode-side distribution passage 40b will be referred to as a "cathode-side combustion discharged gas flow rate Fca".

Next, the technical ideas common to the configurations of the later-described respective embodiments that are applied to the configuration of the fuel cell system S described above will be described.

Figure 2:
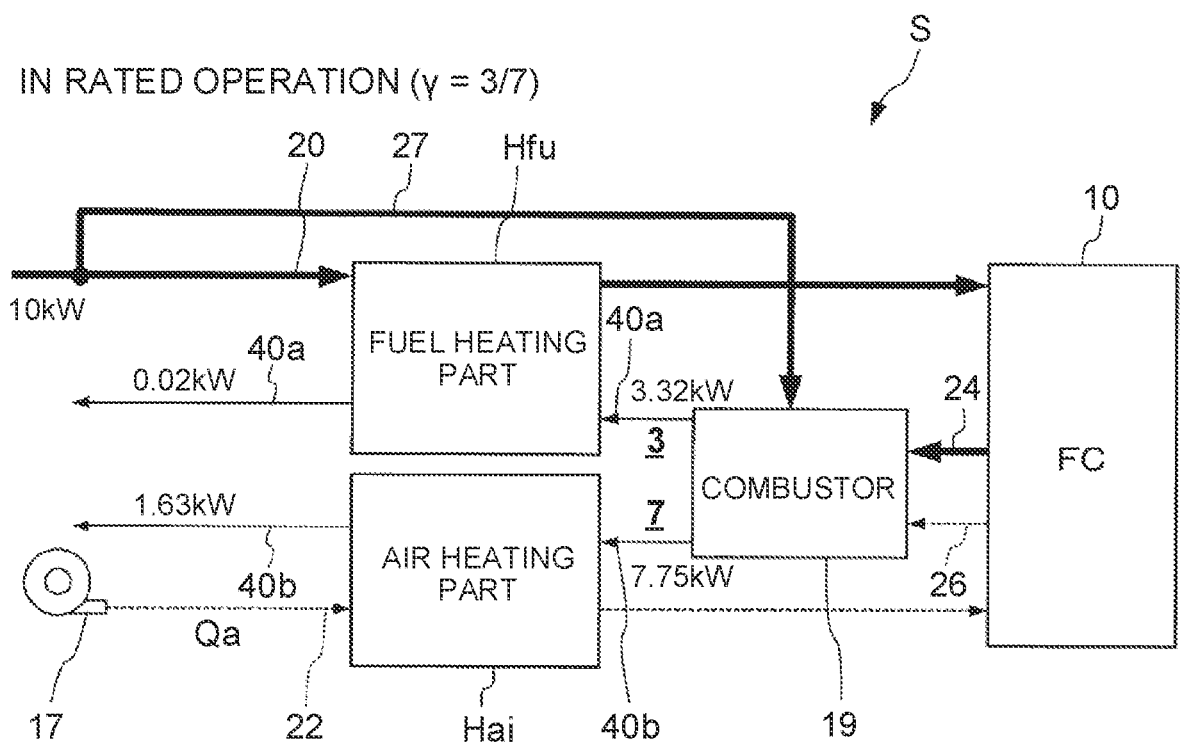
FIG. 2 is a diagram for explaining the relationship between a discharged gas distribution ratio and exhaust energy in a steady operation according to a reference example.

FIG. 2 is a diagram for explaining the relationship between a discharged gas distribution ratio γ set in a steady operation of the fuel cell system S and exhaust energy. Note that a numeral representing thermal energy or a flow rate indicated in the figure is a specific example given in terms of facilitating the understanding of the technical ideas according to the respective embodiments and does not limit the configurations of the respective embodiments.

In FIG. 2, for the simplicity of description, the main part of the configuration of the fuel cell system S illustrated in FIG. 1 is schematically illustrated. In particular, hereinafter, the reformer 16, the evaporator 14, and so on being the elements that heat the fuel by the heat of the combustion discharged gas in the anode-side distribution passage 40a will be collectively referred to as a "fuel heating part Hfu". Further, the air heat exchanger 18 and so on being the elements that heat the air by the heat of the combustion discharged gas in the cathode-side distribution passage 40*b* will be collectively referred to as an "air heating part Hai".

Herein, the steady operation (or the rated operation) of the fuel cell system S means an operating state in which the fuel cell stack 10 operates at an operating point where its power generation efficiency becomes the optimal power generation efficiency based on an approximately steady power-generation electric power (hereinafter also simply referred to as an "optimal operating point").

That is, the steady operation of the fuel cell system S is an operating state that is not a transient operating state (unsteady operation) in which the power-generation electric power changes at a certain or higher rate of change, such as when starting or stopping the fuel cell system S.

In the steady operation, the combustor temperature Tc, the anode-side combustion discharged gas flow rate Fan, and the cathode-side combustion discharged gas flow rate Fca are set in terms of establishing the heat balance to enhance the thermal efficiency (reduce the waste heat) while satisfying the supply air flow rate Qa and the fuel flow rates (the main supply fuel flow rate and the sub supply fuel flow rate) based on the above-described optimal operating point. That is, in the fuel cell system S so far, assuming the suitable thermal efficiency in the steady operation, the configuration of the fuel cell system S, such as the combustion discharged gas passage 40, is designed to properly distribute the anode-side combustion discharged gas flow rate Fan and the cathode-side combustion discharged gas flow rate Fca.

In particular, the fuel cell system S is configured such that the discharged gas distribution ratio γ (≈ Fan/Fca) defined as a ratio of the anode-side combustion discharged gas flow rate Fan to the cathode-side combustion discharged gas flow rate Fca becomes a desired value in terms of realizing the suitable thermal efficiency in the steady operation.

Specifically, in the example illustrated in FIG. 2, the respective configurations are designed so that a discharged gas distribution ratio γ_r set in the steady operation becomes 3/7 (see underlined bold numerals in FIG. 2). Consequently, in the steady operation, it is possible to operate the fuel cell system S with high efficiency by reducing exhaust energy discharged to the outside.

In particular, in the example illustrated in FIG. 2, energy possessed by the combustion discharged gas that is discharged to the outside through the anode-side distribution passage 40*a* (hereinafter also referred to as "anode-side exhaust energy") is 0.02 kW, and energy possessed by the combustion discharged gas that is discharged to the outside through the cathode-side distribution passage 40*b* (hereinafter also referred to as "cathode-side exhaust energy") is about 1.63 kW.

On the other hand, the present inventors have focused on the point that the discharged gas distribution ratio γ that is set by design assuming the steady operation as described above does not necessarily bring about the operation of the fuel cell system S with high thermal efficiency in an unsteady operation such as a warm-up operation at start-up. This point will be described in detail.

Figure 3:
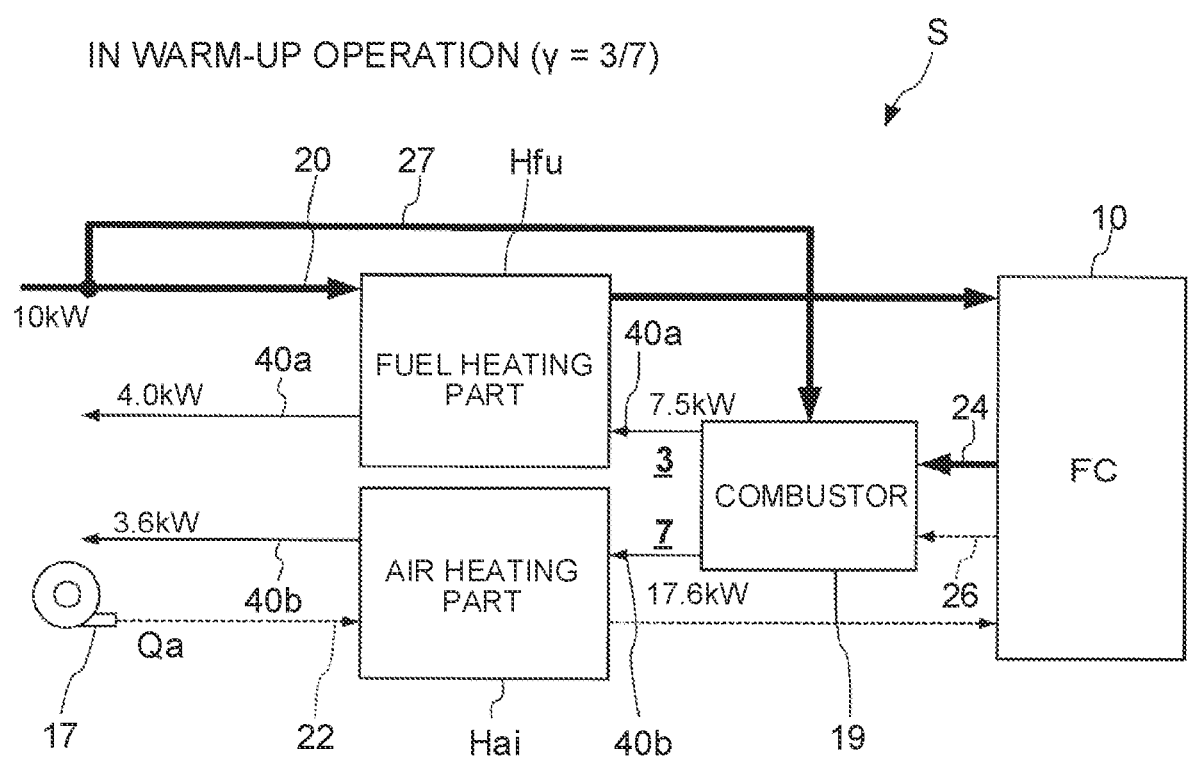
FIG. 3 is a diagram for explaining exhaust energy when a warm-up operation is performed based on the discharged gas distribution ratio in the steady operation according to the reference example.

FIG. 3 is a diagram for explaining exhaust energy when the warm-up operation is performed based on the discharged gas distribution ratio γ_r that is set assuming the steady operation.

Herein, the warm-up operation is an operating mode in which the elements, such as the fuel cell stack 10, in the fuel cell system S are heated (warmed up) to a desired temperature in a low temperature state such as when starting the fuel cell system S. That is, in the warm-up operation, in terms of quickly progressing the warm-up, higher heat energy is required compared to that in the steady operation.

Therefore, the supply air flow rate Qa and the supply fuel flow rates (particularly the sub supply fuel flow rate) are increased in terms of producing more combustion heat in the combustor 19. Therefore, the flow rate of the total combustion discharged gas (hereinafter also referred to as a "total combustion discharged gas flow rate Fto") produced by the combustor 19 is increased.

As a result, an anode-side combustion discharged gas flow rate Fan_w and a cathode-side combustion discharged gas flow rate Fca_w in the warm-up operation are respectively increased compared to an anode-side combustion discharged gas flow rate Fan_r and a cathode-side combustion discharged gas flow rate Fca_r in the steady operation according to the above-described discharged gas distribution ratio γ_r. A description will be given in more detail using as a reference example the air flow rate-pressure loss characteristics in the exhaust system of combustion discharged gas of the fuel cell system S in such a situation.

(Reference Example)

Figure 4:
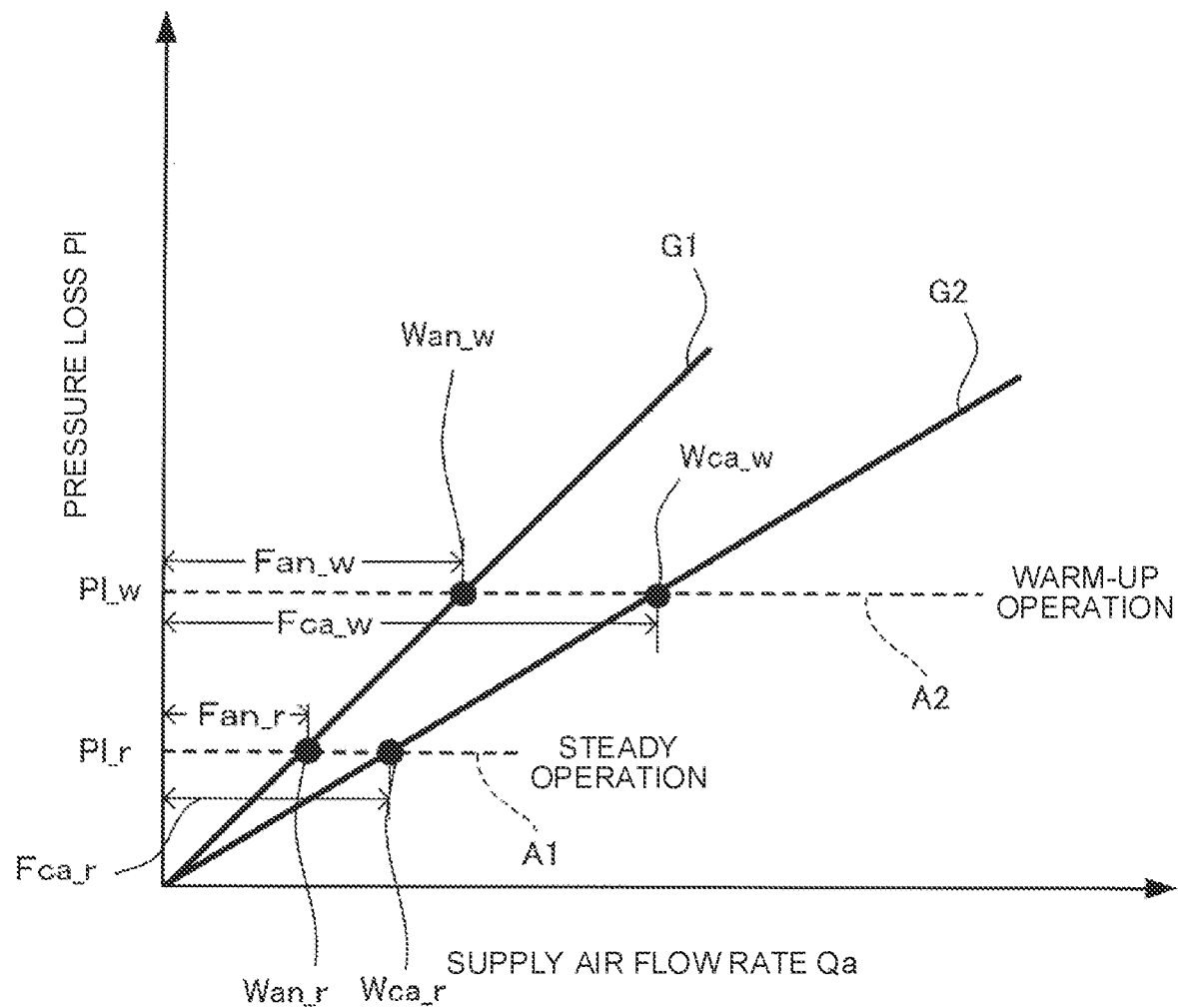
FIG. 4 is a diagram for explaining the air flow rate-pressure loss characteristics in a combustion discharged gas passage according to a reference example.

FIG. 4 is a diagram for explaining the air flow rate-pressure loss characteristics in the combustion discharged gas passage 40 in the fuel cell system S of a reference example. In the fuel cell system S of this reference example, like in the example illustrated in FIGS. 2 and 3, the discharged gas distribution ratio γ having the same value as in the steady operation is set also in the warm-up operation.

FIG. 4 illustrates a graph in which the horizontal axis represents the supply air flow rate Qa and the vertical axis represents the pressure loss Pl in the combustion discharged gas passage 40 (proportional to the flow rate of the combustion discharged gas).

The air flow rate-pressure loss characteristics illustrated in FIG. 4 are determined by the structures of the anode-side distribution passage 40*a*, the cathode-side distribution passage 40*b*, the fuel heating part Hfu, the air heating part Hai, and so on in the fuel cell system S.

In particular, an anode-side characteristic line G1 represents an air flow rate-pressure loss characteristic in the anode-side distribution passage 40*a*, and a cathode-side characteristic line G2 represents an air flow rate-pressure loss characteristic in the cathode-side distribution passage 40*b*.

A pressure loss Pl_r set in the steady operation is indicated as a "steady-time pressure loss line A1" by a broken line. The pressure loss Pl_r is the synthetic pressure loss of the combustion discharged gas passage 40 in the steady operation. A pressure loss Pl_w set in the warm-up operation is indicated as a "warm-up-time pressure loss line A2" by a broken line. The pressure loss Pl_w is the synthetic pressure loss of the combustion discharged gas passage 40 in the warm-up operation.

Herein, the fuel cell system S of this reference example is configured such that, in the steady operation, an anode-side pressure loss Pl_an_r being a pressure loss in the anode-side distribution passage 40*a* and a cathode-side pressure loss Pl_ca_r being a pressure loss in the cathode-side distribution passage 40*b* are equal to each other and constant with respect to a change in the supply air flow rate Qa. That is, the anode-side pressure loss Pl_an_r and the cathode-side pressure loss Pl_ca_r are both set to the pressure loss Pl_r.

Based on a discharged gas distribution ratio γ_r set in the steady operation, an anode-side combustion discharged gas flow rate Fan_r and a cathode-side combustion discharged gas flow rate Fca_r are determined from the anode-side pressure loss Pl_an_r and the cathode-side pressure loss Pl_ca_r. Herein, the discharged gas distribution ratio γ_r in the steady operation is a value determined by Fan_r/Fca_r.

In the corresponding map of FIG. 4, operating points of the anode-side distribution passage 40a and the cathode-side distribution passage 40b are respectively a point Wan_r and a point Wca_r on the steady-time pressure loss line A1.

On the other hand, in the warm-up operation, an anode-side pressure loss Pl_an_w and a cathode-side pressure loss Pl_ca_w both become the pressure loss Pl_w larger than the pressure loss Pl_r according to the increased supply air flow rate Qa.

In the corresponding map of FIG. 4, operating points of the anode-side distribution passage 40a and the cathode-side distribution passage 40b are respectively a point Wan_w and a point Wca_w on the warm-up-time pressure loss line A2.

Herein, as is clear from FIG. 4, the anode-side characteristic line G1 and the cathode-side characteristic line G2 are both indicated to be linear. That is, the respective air flow rate-pressure loss characteristics in the anode-side distribution passage 40a and the cathode-side distribution passage 40b both exhibit approximately first-order characteristics. The reason for this is that the flow path structure of the heat exchanger in the reformer 16 in the fuel heating part Hfu and the flow path structure of the air heat exchanger 18 in the air heating part Hai respectively have large surface areas compared to the normal piping. Therefore, Fan_r/Fca_r being a discharged gas distribution ratio γ_r in the steady operation and Fan_w/Fca_w being a discharged gas distribution ratio γ_w in the warm-up operation take values that are approximately equal to each other.

Therefore, in the fuel cell system S according to this reference example, even when the operating state is changed so that the supply air flow rate Qa is changed, the discharged gas distribution ratio γ is kept constant. As a result, as described above, in the situation where the supply air flow rate Qa is increased in the warm-up operation or the like compared to that in the steady operation, the anode-side combustion discharged gas flow rate Fan_w and the cathode-side combustion discharged gas flow rate Fca_w are increased.

However, heat energy that the fuel can receive from the combustion discharged gas by heat exchange in the fuel heating part Hfu of the anode-side distribution passage 40a is small compared to heat energy that the air can receive from the combustion discharged gas by heat exchange in the air heating part Hai of the cathode-side distribution passage 40b. Therefore, the anode-side combustion discharged gas flow rate Fan_w in the warm-up operation that is increased compared to that in the steady operation exceeds a flow rate corresponding to heat energy that can be heat-exchanged with the fuel in the fuel heating part Hfu. Therefore, exhaust energy is increased so that the warm-up efficiency is reduced.

Specifically, in the example illustrated in FIG. 3, with the discharged gas distribution ratio γ_r=3/7 equal to that in the steady operation, the anode-side exhaust energy is 4.0 kW and the cathode-side exhaust energy is 3.6 kW. Therefore, between the steady operation illustrated in FIG. 2 and the warm-up operation illustrated in FIG. 3, the increased amount of the anode-side exhaust energy (3.98 kW) is large compared to the increased amount of the cathode-side exhaust energy (1.97 kW).

That is, in the unsteady operation, such as the warm-up operation, in which a higher supply air flow rate Qa is set compared to that in the steady operation, there is concern about a reduction in the energy efficiency of the fuel cell system S with the increase in anode-side exhaust energy described above.

In particular, compared to the case where the fuel cell system S is used as a stationary system in a power plant or the like, the increase in anode-side exhaust energy described above appears more significant in the case where the fuel cell system S is used as a non-stationary system that is installed in a moving body such as a vehicle. The reason for this is that it is supposed that, in the case of the stationary system, the system tends to be operated substantially in a steady operation with a low frequency of performing an unsteady operation including stop and start, while, in the case of the non-stationary system that is installed in the moving body such as the vehicle, the frequency of performing an unsteady operation is high where the system is stopped and started with a higher frequency.

Therefore, the present inventors have reached the technical ideas that suppress exhaust energy in the unsteady operation by employing a discharged gas distribution ratio adjustment part that reduces the discharged gas distribution ratio γ according to an increase in the supply air flow rate Qa determined in correlation to the operating state including the steady operation and the unsteady operation.

Figure 5:
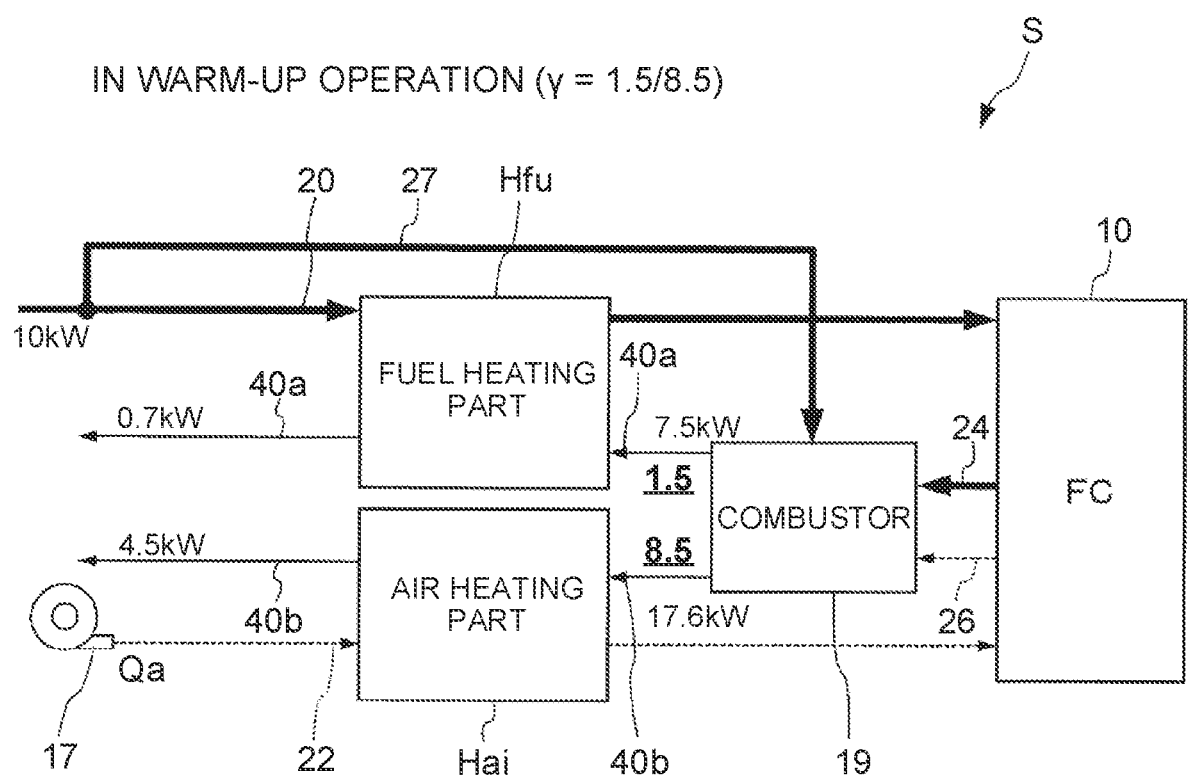
FIG. 5 is a diagram for explaining the technical ideas common to respective embodiments.

FIG. 5 is a diagram for explaining the technical ideas common to the respective embodiments.

In the example illustrated in FIG. 5, the discharged gas distribution ratio γ_w in the warm-up operation is set to 1.5/8.5. That is, in the example of FIG. 5, differently from the example of FIG. 3, the discharged gas distribution ratio γ_w in the warm-up operation is set to the value different from the discharged gas distribution ratio γ_r=3/7 in the steady operation described in FIG. 2. Consequently, the anode-side exhaust energy is 0.7 kW, and the cathode-side exhaust energy is 4.5 kW.

More specifically, in the example illustrated in FIG. 5, compared to the example of FIG. 3, while the cathode-side exhaust energy is increased by 0.9 kW, the anode-side exhaust energy is reduced by 3.3 kW. Therefore, in the example illustrated in FIG. 5, the total exhaust energy is reduced by 2.4 kW compared to the example of FIG. 3.

Hereinafter, specific manners of discharged gas distribution ratio adjustment parts will be described as the first to third embodiments.

First Embodiment

In the fuel cell system S of this embodiment, a description will be given of an example in which a discharged gas distribution ratio adjustment structure that realizes an operation of reducing the discharged gas distribution ratio γ according to an increase in the supply air flow rate Qa is provided as the discharged gas distribution ratio adjustment part in the combustion discharged gas passage 40 (particularly the anode-side distribution passage 40a).

Figure 6:
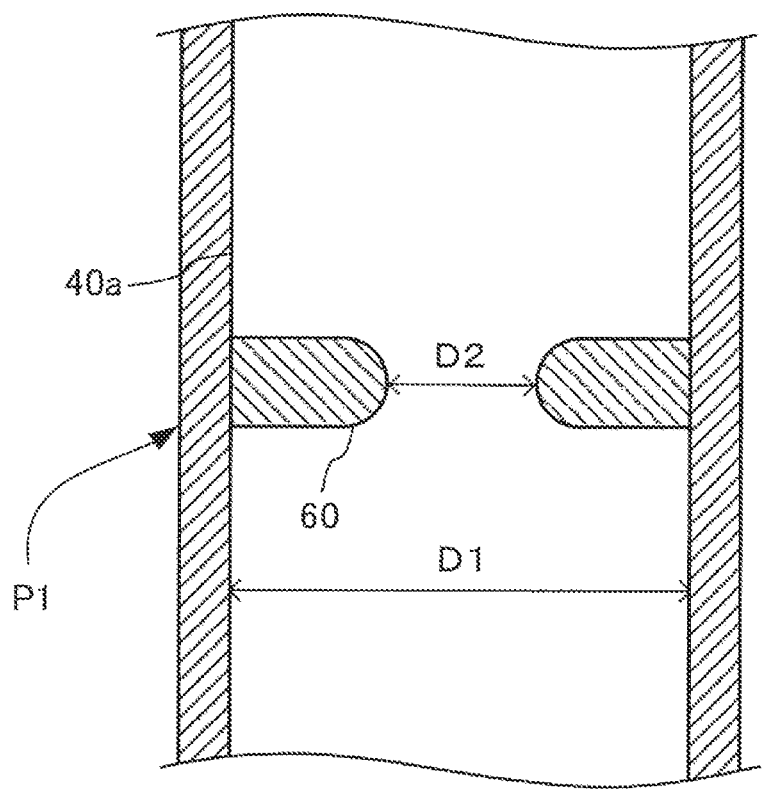
FIG. 6 is a diagram for explaining a discharged gas distribution ratio adjustment structure according to a first embodiment.

FIG. 6 is a diagram for explaining the discharged gas distribution ratio adjustment structure in this embodiment. The discharged gas distribution ratio adjustment structure of this embodiment is configured as a throttle-shaped part 60 serving as a flow path cross-sectional area reduction part provided in the anode-side distribution passage 40a.

The throttle-shaped part 60 is formed to have an orifice diameter D2 that is relatively small compared to a basic flow path diameter D1 of the anode-side distribution passage 40a. In particular, an installation position P1 in the anode-side distribution passage 40a, the basic flow path diameter D1, and the orifice diameter D2 are determined so that the air flow rate-pressure loss characteristic in the anode-side distribution passage 40a represented by the anode-side characteristic line G1 in FIG. 4 exhibits a second-order characteristic through the throttle-shaped part 60.

The installation position P1 is set at a proper position according to the specification of the fuel cell system S, such as in an arbitrary flow path region in the anode-side distribution passage 40a, or in a flow path included in the fuel heating part Hfu (the heat exchanger in the reformer 16, or the like). A plurality of throttle-shaped parts 60 may be provided in the anode-side distribution passage 40a.

Figure 7:
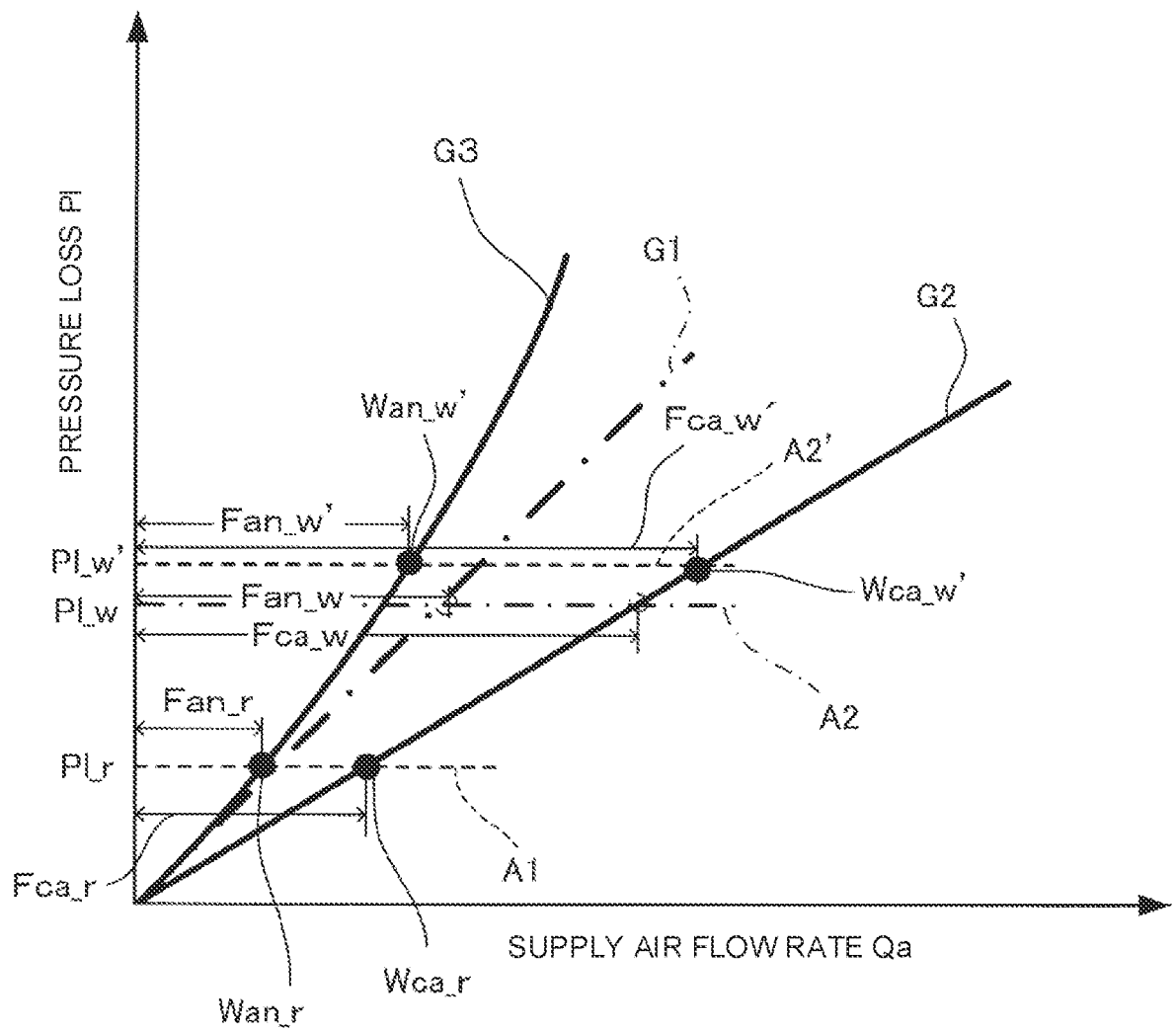
FIG. 7 is a diagram for explaining the air flow rate-pressure loss characteristics in a combustion discharged gas passage according to the configuration of the first embodiment.

FIG. 7 is a diagram for explaining the air flow rate-pressure loss characteristic in the anode-side distribution passage 40a when the throttle-shaped part 60 according to this embodiment is provided therein. In particular, an anode-side characteristic line G3 in FIG. 7 represents the characteristic in the anode-side distribution passage 40a according to the configuration of this embodiment. In FIG. 7, for reference, the anode-side characteristic line G1 described in FIG. 4 is indicated by a one-dot chain line.

As illustrated, in this embodiment, with the throttle-shaped part 60 provided in the anode-side distribution passage 40a, the anode-side characteristic line G3 exhibits the characteristic that changes nonlinearly, particularly changes quadratically, with respect to a change in the supply air flow rate Qa.

Therefore, according to the anode-side characteristic line G3 of this embodiment, the rate of increase in the pressure loss Pl with respect to an increase in the supply air flow rate Qa is large compared to the anode-side characteristic line G1 described in FIG. 4. In particular, in this embodiment, the anode-side pressure loss Pl_an increases quadratically with respect to an increase in the supply air flow rate Qa. Consequently, the warm-up-time pressure loss line A2 (indicated by a one-dot chain line in FIG. 7) in the warm-up operation, where the supply air flow rate Qa is increased, is moved to maintain the total combustion discharged gas flow rate Fto in the combustion discharged gas passage 40 (indicated as a "warm-up-time pressure loss line A2'" in FIG. 7).

More specifically, the combustion discharged gas flow rate in the anode-side distribution passage 40a and the combustion discharged gas flow rate in the cathode-side distribution passage 40b in the warm-up operation according to the air flow rate-pressure loss characteristics of this embodiment are respectively defined as an "anode-side combustion discharged gas flow rate Fan_w'" and a "cathode-side combustion discharged gas flow rate Fca_w'", the warm-up-time pressure loss line A2' (pressure loss Pl_w') is determined so that the sum of them becomes equal to the sum of the anode-side combustion discharged gas flow rate Fan_w and the cathode-side combustion discharged gas flow rate Fca_w based on the air flow rate-pressure loss characteristics in FIG. 4.

Herein, since the anode-side characteristic line G3 exhibits the second-order air flow rate-pressure loss characteristic, the anode-side combustion discharged gas flow rate Fan_w' in the warm-up operation corresponding to a point Wan_w' being a point of intersection between the anode-side characteristic line G3 and the warm-up-time pressure loss line A2' becomes small compared to a value based on the first-order air flow rate-pressure loss characteristic (a combustion discharged gas flow rate based on a point of intersection between the anode-side characteristic line G1 and the warm-up-time pressure loss line A2'). In other words, according to the configuration of this embodiment, the change in the anode-side pressure loss Pl_an with respect to a change in the supply air flow rate Qa becomes more sensitive than the anode-side characteristic line G1 of the reference example illustrated in FIG. 4.

On the other hand, since the cathode-side characteristic line G2 has no change compared to that in FIG. 4, the cathode-side combustion discharged gas flow rate Fca_w' in the warm-up operation corresponding to a point Wca_w' being a point of intersection between the cathode-side characteristic line G2 and the warm-up-time pressure loss line A2' increases linearly with respect to the change from the pressure loss Pl_w to the pressure loss Pl_w'.

Therefore, with the configuration of this embodiment, the discharged gas distribution ratio γ being the ratio of the anode-side combustion discharged gas flow rate Fan_w' to the cathode-side combustion discharged gas flow rate Fca_w' is reduced compared to the value (=Fan_w/Fca_w) in the reference example of FIG. 4. That is, the configuration is realized in which the discharged gas distribution ratio γ is reduced according to an increase in the supply air flow rate Qa.

In the anode-side characteristic line G3 of this embodiment, the anode-side combustion discharged gas flow rate Fan_r determined based on the supply air flow rate Qa in the steady operation is approximately equal to the anode-side combustion discharged gas flow rate Fan_r based on the anode-side characteristic line G1 (see points of intersection between the anode-side characteristic lines G1, G3 and the steady-time pressure loss line A1).

With this as the premise, the anode-side combustion discharged gas flow rate Fan_w' based on the supply air flow rate Qa in the warm-up operation becomes low compared to the case of FIG. 4.

This is caused by the fact that the anode-side characteristic line G3 is substantially a quadratic increasing convex downward function with respect to the supply air flow rate Qa by providing the throttle-shaped part 60. Therefore, while realizing a proper discharged gas distribution ratio γ_r having approximately the same value as in the first embodiment in the steady operation, it is possible to realize a discharged gas distribution ratio γ_w smaller than that in the first embodiment in the warm-up operation where the supply air flow rate Qa is increased.

The operations and effects by the configuration of this embodiment described above will be described.

The fuel cell system S of this embodiment includes the fuel cell stack 10 as a fuel cell that is supplied with a fuel and air to generate an electric power; the combustor 19 that combusts an off-gas discharged from the fuel cell stack 10 to produce a combustion discharged gas; the fuel heating part Hfu (the reformer 16, etc.) that heats the fuel to be supplied to the fuel cell stack 10 by the combustion discharged gas; the air heating part Hai (the air heat exchanger 18, etc.) that heats the air to be supplied to the fuel cell stack 10 by the combustion discharged gas; the anode-side distribution passage 40a that distributes the combustion discharged gas to the fuel heating part Hfu; the cathode-side distribution passage 40b that distributes the combustion discharged gas to the air heating part Hai; and the discharged gas distribution ratio adjustment part that adjusts the discharged gas distribution ratio γ being a ratio of the anode-side combustion discharged gas flow rate Fan as a flow rate of the combustion discharged gas that flows in the anode-side combustion distribution passage, to the cathode-side combustion discharged gas flow rate Fca as a flow rate of the combustion discharged gas that flows in the cathode-side distribution passage 40b.

The discharged gas distribution ratio adjustment part is configured to reduce the discharged gas distribution ratio γ according to an increase in the supply air flow rate Qa as a flow rate of the air to be supplied to the fuel cell stack 10.

Consequently, even when a high supply air flow rate Qa is set according to the operating state of the fuel cell system S so that the total combustion discharged gas flow rate Fto is increased, it is possible to suppress the amount of increase in the anode-side combustion discharged gas flow rate Fan due to such an increase. Therefore, it can be suppressed that the combustion discharged gas at a flow rate corresponding to heat energy exceeding the heat capacity of the fuel is supplied to the fuel heating part Hfu, thereby reducing exhaust energy. That is, even when a change in the supply air flow rate Qa that can cause an increase in the anode-side combustion discharged gas flow rate Fan occurs due to the change of the operating state, it is possible to properly maintain the energy efficiency in the operation of the fuel cell system S.

In particular, in this embodiment, the discharged gas distribution ratio adjustment part includes the discharged gas distribution ratio adjustment structure as a structure provided in the anode-side distribution passage 40*a* (including a passage in the fuel heating part Hfu) and the cathode-side distribution passage 40*b* (including a passage in the air heating part Hai). The discharged gas distribution ratio adjustment structure is configured such that the rate of increase in the anode-side pressure loss Pl_an (the slope of the anode-side characteristic line G1) as a pressure loss in the anode-side distribution passage 40*a* according to an increase in the supply air flow rate Qa becomes larger than the rate of increase in the cathode-side pressure loss Pl_ca (the slope of the cathode-side characteristic line G2) as a pressure loss in the cathode-side distribution passage 40*b* according to the increase in the supply air flow rate Qa.

Consequently, the characteristics that reduce the discharged gas distribution ratio γ according to an increase in the supply air flow rate Qa can be realized by changing the structure in the fuel cell system S without providing a driving component such as a solenoid valve.

The discharged gas distribution ratio adjustment structure of this embodiment includes the throttle-shaped part 60 as a flow path cross-sectional area reduction part that is provided in the anode-side distribution passage 40*a* and reduces the flow rate area of the anode-side combustion discharged gas flow rate Fan.

Consequently, the effect of suppressing the amount of increase in the anode-side combustion discharged gas flow rate Fan according to an increase in the supply air flow rate Qa can be realized with the simple configuration of providing the throttle-shaped part 60 in the anode-side distribution passage 40*a*.

Second Embodiment

Hereinafter, the second embodiment will be described. The same symbols are given to the same elements as those of the first embodiment, and a description thereof is omitted. This embodiment provides a more appropriate example of the discharged gas distribution ratio adjustment structure.

Figure 8:
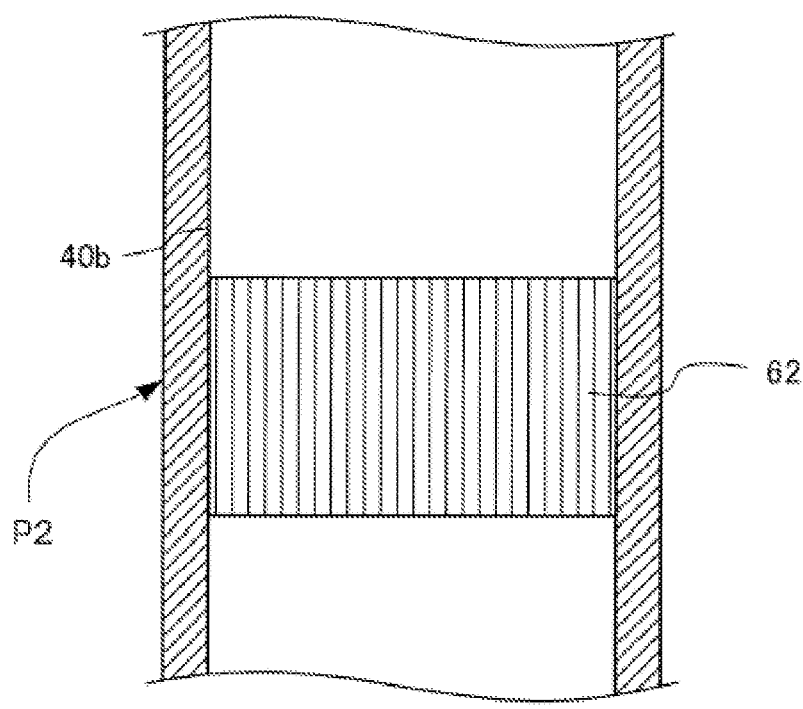
FIG. 8 is a diagram for explaining a discharged gas distribution ratio adjustment structure according to a second embodiment.

FIG. 8 is a diagram for explaining the discharged gas distribution ratio adjustment structure in this embodiment. As illustrated, the discharged gas distribution ratio adjustment structure of this embodiment is configured as a honeycomb structure 62 serving as a flow path surface area increasing part provided in the cathode-side distribution passage 40*b*.

In terms of adjusting the air flow rate-pressure loss characteristic in the cathode-side distribution passage 40*b*, the honeycomb structure 62 is provided at a predetermined installation position P2 in the cathode-side distribution passage 40*b* so as to increase the flow path surface area of the cathode-side distribution passage 40*b* at least partially.

The installation position P2 is set at a proper position according to the specification of the fuel cell system S, such as in an arbitrary flow path region in the cathode-side distribution passage 40*b*, or in a pipe path in the air heat exchanger 18 included in the air heating part Hai. A plurality of honeycomb structures 62 may be provided in the cathode-side distribution passage 40*b*.

Figure 9:
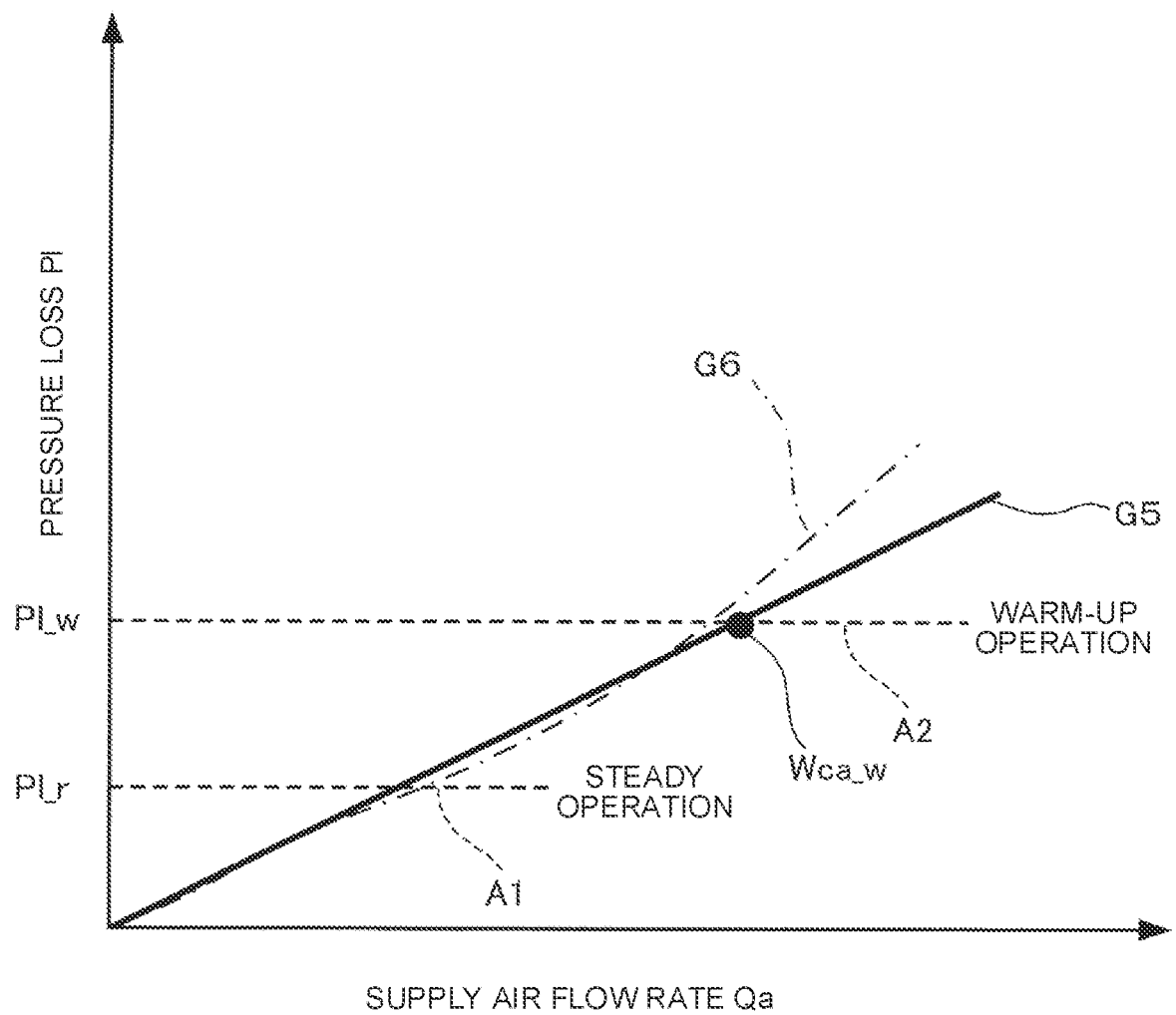
FIG. 9 is a diagram for explaining the air flow rate-pressure loss characteristic in a cathode-side distribution passage when the discharged gas distribution ratio adjustment structure according to the second embodiment is provided.

FIG. 9 is a diagram for explaining the air flow rate-pressure loss characteristic in the cathode-side distribution passage 40*b* when the honeycomb structure 62 according to this embodiment is provided. In FIG. 9, for the simplicity of the drawing, a graph illustrating the air flow rate-pressure loss characteristic in the anode-side distribution passage 40*a* is omitted.

A cathode-side characteristic line G5 indicated in FIG. 9 represents the characteristic in the cathode-side distribution passage 40*b* according to the configuration of this embodiment. Further, for reference, the characteristic in the cathode-side distribution passage 40*b* when the configuration of this embodiment is not employed is indicated as a cathode-side characteristic line G6 by a one-dot chain line.

As illustrated, the cathode-side characteristic line G5 according to this embodiment is close to a linear line compared to the cathode-side characteristic line G6 when the honeycomb structure 62 is not provided. That is, by providing the honeycomb structure 62 in the cathode-side distribution passage 40*b*, it is possible to give the cathode-side distribution passage 40*b* a proper first-order characteristic with respect to a change in the supply air flow rate Qa.

In particular, by the first-order characteristic represented by the cathode-side characteristic line G5, the sensitivity of increase in the cathode-side pressure loss Pl_ca_w with respect to an increase in the supply air flow rate Qa near an operating point in the warm-up operation becomes low compared to the sensitivity of increase in the cathode-side pressure loss Pl_ca_w based on the cathode-side characteristic line G6.

That is, by the first-order characteristic of the cathode-side characteristic line G5 brought about by the honeycomb structure 62, the cathode-side combustion discharged gas flow rate Fca is increased more properly according to an increase in the supply air flow rate Qa.

As a result, by the honeycomb structure 62, it is possible to obtain a property that reduces the anode-side combustion discharged gas flow rate Fan with high sensitivity as the supply air flow rate Qa is increased.

The operations and effects by the configuration of this embodiment described above will be described.

The discharged gas distribution ratio adjustment structure of this embodiment includes the honeycomb structure 62 as the flow path surface area increasing part that is provided in the cathode-side distribution passage 40*b* and increases the flow path surface area for the cathode-side combustion discharged gas flow rate Fca.

Consequently, the effect of suppressing the amount of increase in the anode-side combustion discharged gas flow rate Fan according to an increase in the supply air flow rate Qa can be realized with the simple configuration of providing the honeycomb structure 62 in the cathode-side distribution passage 40*b*.

Third Embodiment

Hereinafter, the third embodiment will be described. The same symbols are given to the same elements as those of the first or second embodiment, and a description thereof is omitted. In this embodiment, the discharged gas distribution ratio adjustment part that reduces the discharged gas distribution ratio γ according to an increase in the supply air flow rate Qa is realized by the control configuration.

Figure 10:
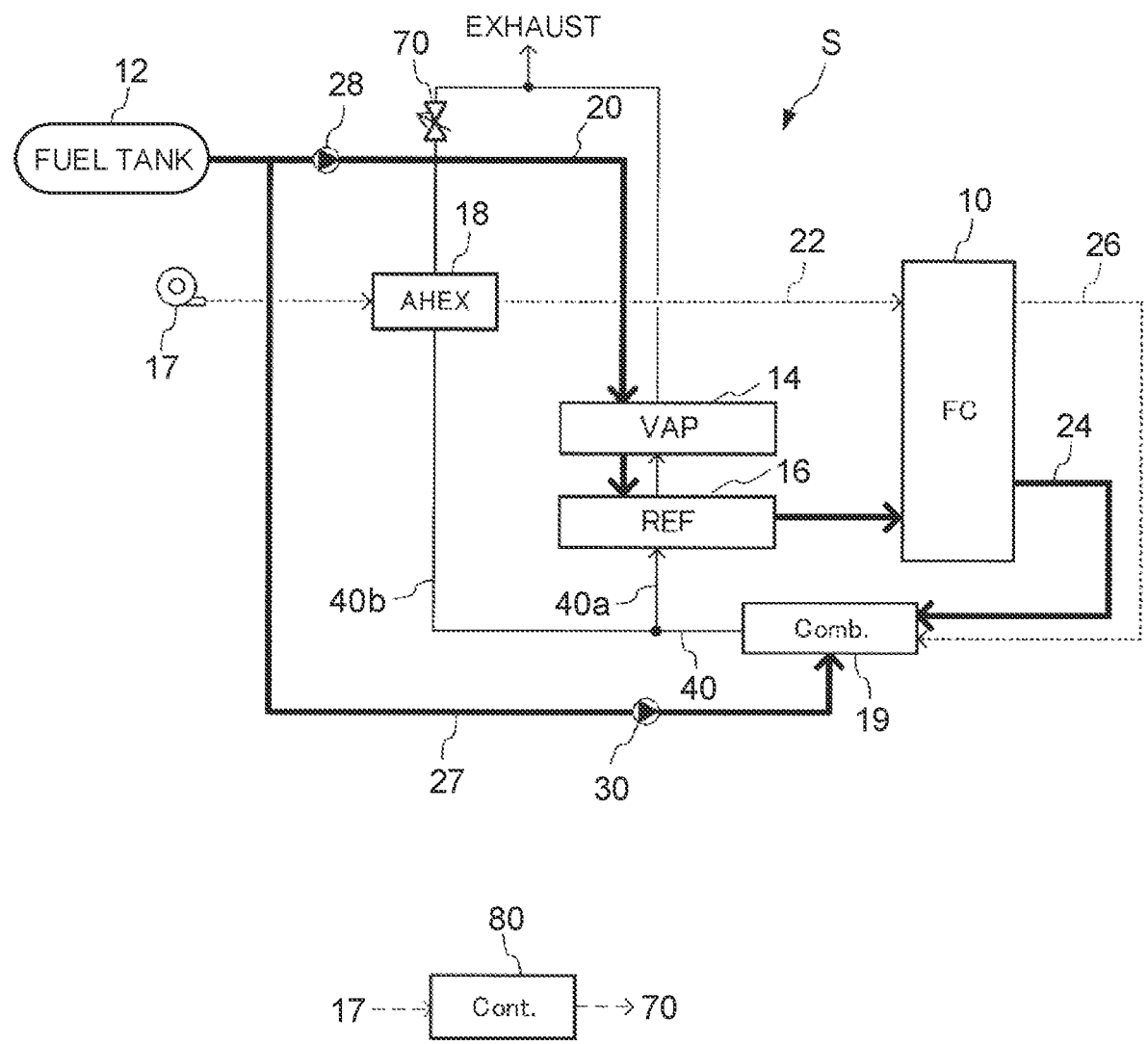
FIG. 10 is a diagram for explaining the configuration of a fuel cell system according to a third embodiment.

FIG. 10 is a diagram for explaining the configuration of the fuel cell system S according to this embodiment. As illustrated, in this embodiment, a flow rate adjustment valve 70 as a flow rate adjustment device, and a controller 80 as a control device that controls the flow rate adjustment valve 70, are further provided to the configuration of the fuel cell system S described in FIG. 1.

The flow rate adjustment valve 70 of this embodiment is provided in the cathode-side distribution passage 40b. The flow rate adjustment valve 70 is configured by a solenoid valve that is adjustable in opening degree so as to arbitrarily control the cathode-side combustion discharged gas flow rate Fca in the cathode-side distribution passage 40b in response to a command from the controller 80.

Herein, since the structure is such that the anode-side distribution passage 40a and the cathode-side distribution passage 40b are branched from the combustor 19, when the cathode-side combustion discharged gas flow rate Fca is controlled by adjusting the opening degree of the flow rate adjustment valve 70, the anode-side combustion discharged gas flow rate Fan in the anode-side distribution passage 40a is controlled inevitably. That is, the discharged gas distribution ratio γ can be substantially adjusted by adjusting the opening degree of the flow rate adjustment valve 70.

Based on the supply air flow rate Qa set to the air blower 17, the controller 80 operates the flow rate adjustment valve 70 to control the cathode-side combustion discharged gas flow rate Fca to a desired value.

Specifically, the controller 80 is composed of a computer, particularly a microcomputer, including a central processing unit (CPU), a read only memory (ROM), a random access memory (RAM), and an input/output interface (I/O interface). The controller 80 is programmed to execute processes necessary for performing respective processes according to this embodiment.

The controller 80 may be configured as a single device or may be configured by a plurality of separate devices so as to perform distributed processing of respective processes of this embodiment by the plurality of devices.

The controller 80 adjusts an opening degree OP of the flow rate adjustment valve 70 based on the supply air flow rate Qa.

Figure 11:
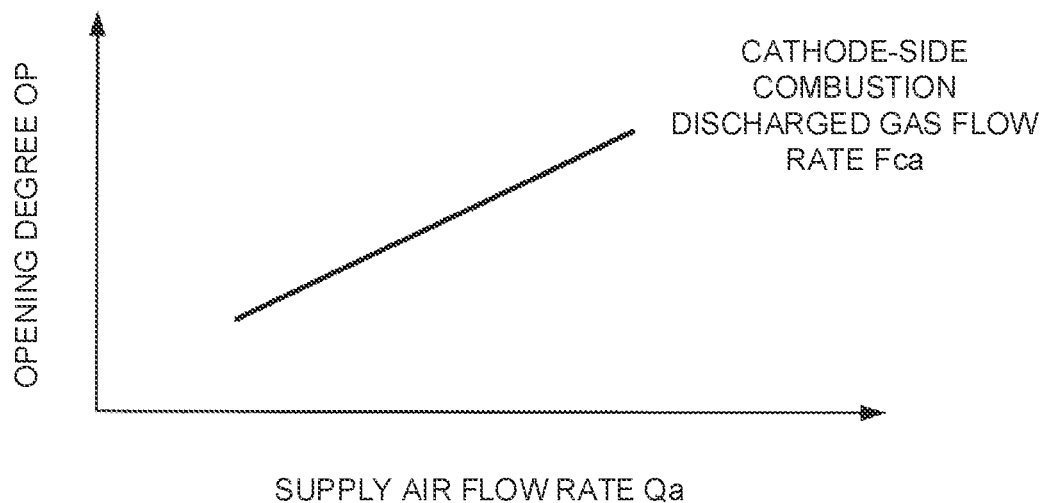
FIG. 11 is a graph for explaining a basic opening degree adjustment manner of a flow rate control valve.

FIG. 11 is a graph for explaining a basic opening degree adjustment manner of the flow rate adjustment valve 70. As illustrated, the controller 80 increases the opening degree OP of the flow rate adjustment valve 70 so that the cathode-side combustion discharged gas flow rate Fca is increased (the discharged gas distribution ratio γ is reduced) as the supply air flow rate Qa is increased.

While basically controlling the flow rate adjustment valve 70 in the control manner illustrated in FIG. 11, the controller 80 controls the flow rate adjustment valve 70 so that the anode-side combustion discharged gas flow rate Fan is limited to equal to or less than a predetermined upper limit flow rate Fsup.

More specifically, the controller 80 estimates the anode-side combustion discharged gas flow rate Fan based on the supply air flow rate Qa set according to the current operating state.

Further, the controller 80 sets a lower limit of the opening degree OP of the flow rate adjustment valve 70 so that the estimated anode-side combustion discharged gas flow rate Fan becomes equal to or less than the upper limit flow rate Fsup.

The upper limit flow rate Fsup is determined based on the maximum value of the main supply fuel flow rate (the maximum fuel injection amount of the first injector 28) based on the currently set supply air flow rate Qa, the specific heat of the fuel, the temperature of the combustion discharged gas in the combustion discharged gas passage 40, and the fuel temperature (e.g. the temperature of the raw fuel stored in the fuel tank 12).

More specifically, the upper limit flow rate Fsup can be calculated by multiplying the maximum value of the main supply fuel flow rate×the specific heat of the fuel×(the temperature of the combustion discharged gas−the fuel temperature) by an appropriate gain. That is, the upper limit flow rate Fsup is calculated as a value of the anode-side combustion discharged gas flow rate Fan in terms of heat energy that the fuel can receive from the combustion discharged gas by heat exchange in the fuel heating part Hfu when assuming the maximum main supply fuel flow rate estimated based on the current operating state.

Assuming the case where the temperature of the fuel supplied to the fuel heating part Hfu largely differs from the temperature of the raw fuel due to evaporation of the raw fuel by the evaporator 14, the upper limit flow rate Fsup may be calculated using the temperature of the fuel in the main fuel supply passage 20 after passing through the evaporator 14, instead of the temperature of the raw fuel in the fuel tank 12.

Further, the controller 80 sets an upper limit of the opening degree OP of the flow rate adjustment valve 70 so that the anode-side combustion discharged gas flow rate Fan becomes equal to or higher than a predetermined lower limit flow rate Finf.

The lower limit flow rate Finf is determined based on the main supply fuel flow rate based on the currently set supply air flow rate Qa, the specific heat of the fuel, the target reformer temperature (the target value of the temperature of the fuel gas downstream of the reformer 16 in the main fuel supply passage 20), and the fuel temperature described above.

More specifically, the lower limit flow rate Finf can be calculated by multiplying the currently set main supply fuel flow rate×the specific heat of the fuel×(the target reformer temperature−the fuel temperature) by an appropriate gain. That is, the lower limit flow rate Finf is calculated as a value of the anode-side combustion discharged gas flow rate Fan in terms of a lower limit of heat energy that should be given to the fuel from the combustion discharged gas by heat exchange in the fuel heating part Hfu with respect to the main supply fuel flow rate according to power-generation electric power based on the current operating state.

According to this embodiment described above, while adjusting the opening degree OP of the flow rate adjustment valve 70 so that the discharged gas distribution ratio γ is reduced as the supply air flow rate Qa set according to the current operating state is increased, the controller 80 controls the opening degree OP of the flow rate adjustment valve 70 so that the anode-side combustion discharged gas flow rate Fan falls between the upper limit flow rate Fsup and the lower limit flow rate Finf.

The operations and effects by the configuration of this embodiment described above will be described.

The discharged gas distribution ratio adjustment part of this embodiment includes the flow rate adjustment valve 70 as the flow rate adjustment device that adjusts the flow rate in at least one of the anode-side distribution passage 40a and the cathode-side distribution passage 40b, and the controller 80 as the control device that operates the flow rate adjustment valve 70. The controller 80 operates the flow rate adjustment valve 70 so that the cathode-side combustion discharged gas flow rate Fca is increased, i.e. the discharged gas distribution ratio γ is reduced, as the supply air flow rate Qa is increased.

Consequently, even when the supply air flow rate Qa is increased due to the change of the operating state of the fuel cell system S or the like, the opening degree OP of the flow rate adjustment valve 70 is adjusted so that the cathode-side combustion discharged gas flow rate Fca is increased according to such an increase. That is, the opening degree OP of the flow rate adjustment valve 70 is adjusted to the side where the anode-side combustion discharged gas flow rate Fan is reduced, and therefore, it is possible to suppress an increase in the anode-side combustion discharged gas flow rate Fan.

In this embodiment, the controller 80 estimates the anode-side combustion discharged gas flow rate Fan based on the supply air flow rate Qa and operates the flow rate adjustment valve 70 so that the estimated anode-side combustion discharged gas flow rate Fan becomes equal to or less than the upper limit flow rate Fsup determined based on acceptable heat energy of the fuel in the fuel heating part Hfu.

Consequently, the discharged gas distribution ratio γ can be adjusted by operating the flow rate adjustment valve 70 so that the anode-side combustion discharged gas flow rate Fan does not exceed the upper limit flow rate Fsup being the upper limit of the heat capacity of the fuel in the fuel heating part Hfu. Therefore, it can be suppressed more reliably that the combustion discharged gas at a flow rate corresponding to heat energy exceeding the heat capacity of the fuel is supplied to the fuel heating part Hfu.

Further, in this embodiment, the controller 80 estimate the anode-side combustion discharged gas flow rate Fan based on the supply air flow rate Qa and operates the flow rate adjustment valve 70 so that the estimated anode-side combustion discharged gas flow rate Fan becomes equal to or higher than the lower limit flow rate Finf determined based on the target temperature of the fuel heating part (the target reformer temperature) according to power-generation electric power.

Consequently, while it is possible to suppress an increase in the anode-side combustion discharged gas flow rate Fan in terms of suppressing causing the combustion discharged gas having heat energy equal to or larger than the heat capacity of the fuel to flow to the fuel heating part Hfu, it is possible to properly ensure the minimum anode-side combustion discharged gas flow rate Fan corresponding to heat energy required in terms of the power generation of the fuel cell stack 10.

In this embodiment, the fuel cell system S having the configuration in which the flow rate adjustment valve 70 is provided in the cathode-side distribution passage 40b has been described. However, instead of this configuration or along with this configuration, the flow rate adjustment valve 70 may be provided in the anode-side distribution passage 40a. In this way, the discharged gas distribution ratio γ can be adjusted even by adjusting an opening degree OP' of the flow rate adjustment valve 70 provided in the anode-side distribution passage 40a.

Figure 12:
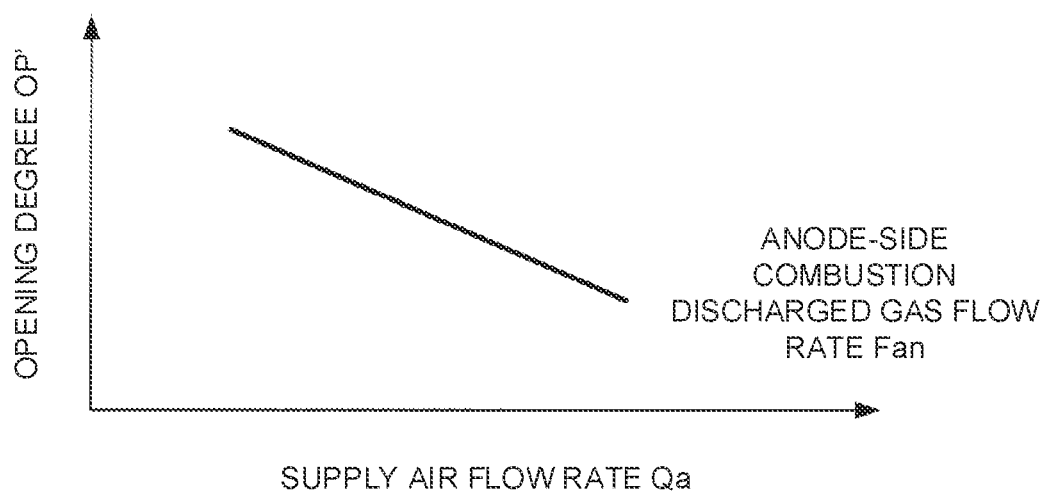
FIG. 12 is a graph for explaining another opening degree adjustment manner of a flow rate control valve.

FIG. 12 is a graph for explaining a basic opening degree adjustment manner of the flow rate adjustment valve 70 when the flow rate adjustment valve 70 is provided in the anode-side distribution passage 40a. In this case, as illustrated, the controller 80 reduces the opening degree OP' of the flow rate adjustment valve 70 so that the anode-side combustion discharged gas flow rate Fan is reduced (the discharged gas distribution ratio γ is reduced) as the supply air flow rate Qa is increased.

Also in this example, it is possible to employ the configuration in which the controller 80 controls the opening degree OP' of the flow rate adjustment valve 70 so that the anode-side combustion discharged gas flow rate Fan falls between the upper limit flow rate Fsup and the lower limit flow rate Finf.

While the embodiments of the present invention have been described above, the above-described embodiments only show part of application examples of the present invention and are not intended to limit the technical scope of the present invention to the specific configurations of the above-described embodiments. Various modifications and alterations can be made to the above-described embodiments within the scope of the matter recited in the claims.

For example, in the respective embodiments described above, the evaporator 14 and the reformer 16 are given as the elements of the fuel heating part Hfu by way of example, and the air heat exchanger 18 is given as the element of the air heating part Hai by way of example. However, the fuel heating part Hfu and the air heating part Hai are not limited to them.

That is, arbitrary devices that respectively heat the fuel and the air by the heat of the anode-side combustion discharged gas and the cathode-side combustion discharged gas in the fuel cell system S can be applied as the fuel heating part Hfu and the air heating part Hai.

In the first embodiment described above, the structure is employed in which the air flow rate-pressure loss characteristic (second-order convex downward characteristic) represented by the anode-side characteristic line G3 in FIG. 7 is obtained in the anode-side distribution passage 40a. However, instead of this structure or along with this structure, a structure may be employed that gives a second-order convex upward air flow rate-pressure loss characteristic to the cathode-side distribution passage 40b. Consequently, the discharged gas distribution ratio γ in the warm-up operation (the operating state in which the supply air flow rate Qa is relatively high) can be further reduced compared to the case of the steady operation (the operating state in which the supply air flow rate Qa is relatively low).

Further, a discharged gas distribution ratio adjustment structure may be provided that gives a property being an arbitrary nonlinear characteristic other than a second-order characteristic and represented by a convex downward characteristic line, instead of the second-order convex downward characteristic represented by the anode-side characteristic line G3. Also in the cathode-side distribution passage 40b, a discharged gas distribution ratio adjustment structure may be provided that gives a property being an arbitrary nonlinear characteristic other than a second-order characteristic and represented by a convex upward characteristic line.

Further, the above-described respective embodiments can be arbitrarily combined with each other. In particular, the configuration of the first embodiment or the second embodiment and the configuration of the third embodiment may be combined. Consequently, while using as a basis the mechanical structure for adjusting the discharged gas distribution ratio γ based on the supply air flow rate Qa (the first embodiment or the second embodiment), the adjustment of the discharged gas distribution ratio γ in response to sequential changes in the supply air flow rate Qa can be performed by the operation of the flow rate adjustment valve 70 in the third embodiment.

The invention claimed is:

1. A fuel cell system comprising:
   a fuel cell configured to be supplied with a fuel and air to generate an electric power;
   a combustor configured to combust an off-gas discharged from the fuel cell to produce a combustion discharged gas;
   a fuel heating part configured to heat the fuel to be supplied to the fuel cell by the combustion discharged gas;
   an air heating part configured to heat the air to be supplied to the fuel cell by the combustion discharged gas;
   an anode-side distribution passage configured to distribute the combustion discharged gas to the fuel heating part and communicate with outside air via the fuel heating part;
   a cathode-side distribution passage configured to distribute the combustion discharged gas to the air heating part, be joined to the anode-side distribution passage via the air heating part, and communicate with the outside air; and
   a discharged gas distribution ratio adjustment part configured to adjust a discharged gas distribution ratio, the discharged gas distribution ratio being a ratio of an anode-side combustion discharged gas flow rate to a cathode-side combustion discharged gas flow rate,
   the anode-side combustion discharged gas flow rate being a flow rate of the combustion discharged gas that flows in the anode-side distribution passage,
   the cathode-side combustion discharged gas flow rate being a flow rate of the combustion discharged gas that flows in the cathode-side distribution passage,
   wherein the discharged gas distribution ratio adjustment part is configured to reduce the discharged gas distribution ratio according to an increase in a supply air flow rate as a flow rate of the air to be supplied to the fuel cell.

2. The fuel cell system according to claim 1, wherein:
   the discharged gas distribution ratio adjustment part includes a discharged gas distribution ratio adjustment structure provided in the anode-side distribution passage and the cathode-side distribution passage; and
   the discharged gas distribution ratio adjustment structure is configured such that a rate of increase in a pressure loss in the anode-side distribution passage according to the increase in the supply air flow rate becomes larger than a rate of increase in a pressure loss in the cathode-side distribution passage according to the increase in the supply air flow rate.

3. The fuel cell system according to claim 2, wherein the discharged gas distribution ratio adjustment structure includes a flow path cross-sectional area reduction part provided in the anode-side distribution passage and configured to reduce a flow path cross-sectional area for the combustion discharged gas.

4. The fuel cell system according to claim 2, wherein the discharged gas distribution ratio adjustment structure includes a flow path surface area increasing part provided in the cathode-side distribution passage and configured to increase a flow path surface area for the combustion discharged gas.

5. The fuel cell system according to claim 1, wherein:
   the discharged gas distribution ratio adjustment part includes a flow rate adjustment device configured to adjust the flow rate of the combustion discharged gas in at least one of the anode-side distribution passage or the cathode-side distribution passage, and a control device configured to operate the flow rate adjustment device; and
   the control device is configured to operate the flow rate adjustment device so that the discharged gas distribution ratio is reduced as the supply air flow rate is increased.

6. The fuel cell system according to claim 5, wherein:
   the control device is configured to estimate the anode-side combustion discharged gas flow rate based on the supply air flow rate; and
   the control device is configured to operate the flow rate adjustment device so that the anode-side combustion discharged gas flow rate estimated becomes equal to or less than an upper limit flow rate determined based on acceptable heat energy of the fuel in the fuel heating part.

7. The fuel cell system according to claim 5, wherein:
   the control device is configured to estimate the anode-side combustion discharged gas flow rate based on the supply air flow rate; and
   the control device is configured to operate the flow rate adjustment device so that the anode-side combustion discharged gas flow rate estimated becomes equal to or higher than a lower limit flow rate determined based on a target temperature of the fuel heating part according to power-generation electric power.

* * * * *